(12) United States Patent
Kim

(10) Patent No.: US 6,407,782 B1
(45) Date of Patent: Jun. 18, 2002

(54) ARRAY SUBSTRATE HAVING COLOR FILTER FOR LIQUID CRYSTAL DISPLAY DEVICE AND METHOD OF MANUFACTURING THE SAME

(75) Inventor: Woong-Kwon Kim, Kyonggi-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/712,193

(22) Filed: Nov. 15, 2000

(30) Foreign Application Priority Data

Nov. 15, 1999 (KR) .............................. 99-50513

(51) Int. Cl.[7] ..................... G02F 1/1335; G02F 1/3333
(52) U.S. Cl. ......................................... 349/106; 349/59
(58) Field of Search ............................. 349/41, 42, 43, 349/78, 106, 59, 97, 104

(56) References Cited

U.S. PATENT DOCUMENTS

| 5,724,107 | A | * | 3/1998 | Nishikawa et al. | ........... | 348/38 |
| 5,757,452 | A | * | 5/1998 | Masaki et al. | .............. | 349/110 |
| 5,933,208 | A | * | 8/1999 | Kim | ........................... | 349/106 |
| 5,994,721 | A | * | 11/1999 | Zhong et al. | ................. | 257/89 |
| 6,162,510 | A | * | 12/2000 | Kashiwazaki | ............... | 427/511 |
| 6,211,928 | B1 | * | 3/2001 | Oh et al. | ..................... | 349/43 |

FOREIGN PATENT DOCUMENTS

| JP | 411190859 A | * | 7/1999 |
| JP | 2001066582 A | * | 3/2001 |

* cited by examiner

Primary Examiner—William L. Sikes
Assistant Examiner—Hoan C. Nguyen
(74) Attorney, Agent, or Firm—Birch, Stewart Kolasch & Birch, LLP

(57) ABSTRACT

Disclosed is a method of fabricating array substrates (and the resulting substrates themselves) for use in a liquid crystal display device, one such method including: forming a gate line having a gate electrode on a substrate; forming a color filter layer on the substrate, the color filter layer being spaced apart; forming an insulating layer; forming a semiconductor layer and an ohmic contact layer; forming a data line crossing the gate line; forming source and drain electrodes on the active layer to produce an intermediate structure; forming a protecting layer of transparent insulating material on the intermediate structure; and forming a pixel electrode on the protecting layer while contacting the drain electrode through the drain contact hole. Some processing steps can be eliminated by using the gate and date lines as the black matrix. Having the insulation layer between data line and pixel electrode include BCB can reduce the parasitic capacitance between them.

12 Claims, 10 Drawing Sheets

ARRAY SUBSTRATE HAVING COLOR FILTER FOR LIQUID CRYSTAL DISPLAY DEVICE AND METHOD OF MANUFACTURING THE SAME

CROSS REFERENCE

This application claims the benefit of Korean Patent Application No. 1999-0050513, filed on Nov. 15, 1999, under 35 U.S.C. § 119, the entirety of which is hereby incorporated by reference.

BACKGROUND OF THE INVENTION

1. Field of the invention

The present invention relates to a liquid crystal display device, and more particularly, to an array substrate having color filters for use in a liquid crystal display (LCD) device and a method of manufacturing the same.

2. Description of Related Art

A typical LCD device includes upper and lower substrates with a liquid crystal layer interposed therebetween. The upper substrate includes a color filter and a common electrode. The lower substrate includes a switching element and a pixel electrode and is called an array substrate. The lower and upper substrates are assembled after being formed separately. During the forming processes the upper substrate experiences some heating treatment such as pre-bake, exposure to light, post-bake and so on, mainly for formation of color filters, which may result in deformation of the elements of the upper substrate, which causes misalignment for assembling of the lower and upper substrates.

In this aspect, the lower substrate or array substrate having color filters is suggested. FIG. 1 is a plan view of the conventional array substrate having color filters. On the substrate 11, gate and data lines 13 and 15 cross each other in the matrix and the near the cross points there are formed thin film transistors "T", each of which is comprised of a gate electrode 17 which is a portion of the gate line 13, an active layer 19, a source electrode 21, and a drain electrode 23. For the simplicity, there is shown only one transistor "T".

A pixel electrode 25, which is connected to the drain electrode 23 via a contact hole 27, is formed in a pixel region defined by the gate and data lines 13 and 15.

Under the pixel electrode 25 is positioned a color filter 29 which partially overlaps the gate and data lines 13 and 15. A black matrix 31 is formed along the gate line 13 covering the thin film transistor in order to prevent light from entering the active layer 19.

FIGS. 2a to 2e are cross sectional views taken along line II—II of FIG. 1 showing a fabricating process.

As shown in FIG. 2a, on the substrate 11 a gate line 13 having gate electrode 17 is formed and the gate insulating layer 18 is formed on the gate line 13. On the gate insulating layer 18 over the gate electrode 17 an active layer 19 is formed, and at the end portions of the active layer 19 the source and drain electrodes 21 and 23 are formed, which defines an intermediate structure. The source electrode 21 is elongated from the data line 15. Next, a first protecting layer 20 of insulating material is formed over the intermediate structure.

And then, as shown in FIG. 2b, a color filter layer 29 is formed on a pixel region defined by the gate and data lines 13 and 15. The color of the filter layer is one of green (G), red (R) or blue (B) and overlaps the gate and data lines 13 and 15 except over the active layer 19 and a portion 27 over the drain electrode 23.

Next, a black matrix 31 is formed over the active layer 19. Chrome, CR, is generally used for the black matrix 31, since it has a low value of light reflection.

Next, a second protecting layer 33 of benzocyclobutene (BCB) is formed and a drain contact hole corresponding to the portion 27 is formed by etching the first and second protecting layers 20 and 33.

Next, as shown in FIG. 2e, a pixel electrode 25 of transparent conductive material is formed while being connected to the drain electrode 23 through the contact hole 27.

The color filter layer can be formed in the array substrate by the process explained above, and misalignment can be reduced. However, in this type of array substrate, two protecting layers 20 and 33 are necessary, which requires more complicated processing.

It should be noted that the parasite capacitance between the pixel electrode 25 and the data line 15, which causes cross talk, is required to be reduced.

SUMMARY OF THE INVENTION

To overcome the problems described above, embodiments of the present invention provide array substrates (and methods of making the same) for use in a liquid crystal display device, which have a structure that can simplify the manufacturing process and reduce the parasitic capacity between the pixel electrode and the data line.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

In an aspect of the invention, the present invention provides a method of fabricating an array substrate (as well as the array substrate itself), the method including: forming a gate line having a gate electrode on a substrate; forming a color filter layer on the substrate, the color filter layer spaced apart from the gate line; forming a first insulating layer on the color filter layer and the gate line; forming a semiconductor layer and ohmic contact layer sequentially on the gate electrode; forming a data line crossing the gate line; forming source and drain electrodes on the ohmic contact layer; wherein the formation of the data line and the source and drain electrodes completes an intermediate structure; forming a protecting layer of transparent insulating material on the intermediate structure, the protecting layer having a drain contact hole at a corresponding position of the drain electrode; and forming a pixel electrode on the protecting layer that contacts the drain electrode through the drain contact hole. Such an array substrate eliminates a need for separate or discrete black matrix elements because the arrangement permits the gate and data lines to also perform the light blocking function of the black matrix.

In an another aspect of the invention, the present invention provides a method of fabricating an array substrate (as well as the substrate itself) for an LCD device, the method including: forming a light shielding layer having a shape of an island on a substrate; forming a buffer layer on the substrate and the light shielding layer; forming an active layer on the buffer layer over the light shielding layer, the active layer having an island shape; forming a first insulating layer on the active layer and the buffer layer; forming a gate electrode on the first insulating layer; forming a color filter spaced apart from the gate electrode on the same plane as the gate electrode to complete an intermediate structure; forming a gate insulating layer of transparent insulating material on the intermediate structure, the gate insulating layer having first and second contact holes; forming the source and drain electrodes on the protecting layer, the source and drain electrodes connecting to the active layer via the first and second contact holes, respectively; forming a protecting layer of transparent insulating material on the source and drain electrodes, the protecting layer having a drain contact hole exposing the drain electrode; forming a pixel electrode on the protecting layer, the pixel electrode connecting to the drain electrode through the drain contact hole.

In an another aspect of the invention, the invention provides a method for fabricating an array substrate (as well as the array substrate itself), for an LCD device, the method including: forming a light shielding layer on a substrate; forming a first insulating layer on the light shielding layer; forming an active layer on the first insulating layer; forming a second insulating layer on the active layer; forming a gate electrode on the second insulating layer; forming a third insulating layer on the gate electrode; forming source and drain electrodes on the third insulating layer, the source and drain electrodes connecting to the active layer; forming a color filter layer on the third insulating layer; forming a fourth insulating layer of transparent material on the source and drain electrodes and the color filter layer; and forming a pixel electrode on the fourth insulating layer, the pixel electrode contacting the drain electrode.

BRIEF DESCRIPTION OF THE DRAWINGS

The present invention will become more fully understood from the detailed description given hereinbelow and the accompanying drawings which are given by way of illustration only, and thus do not limit the present invention.

In the accompanying drawings, like reference numerals denote like parts.

DETAILED DESCRIPTION OF PREFERRED EMBODIMENTS

Reference will now be made in detail to example embodiments of the present invention, example of which is illustrated in the accompanying drawings.

Figure 1:
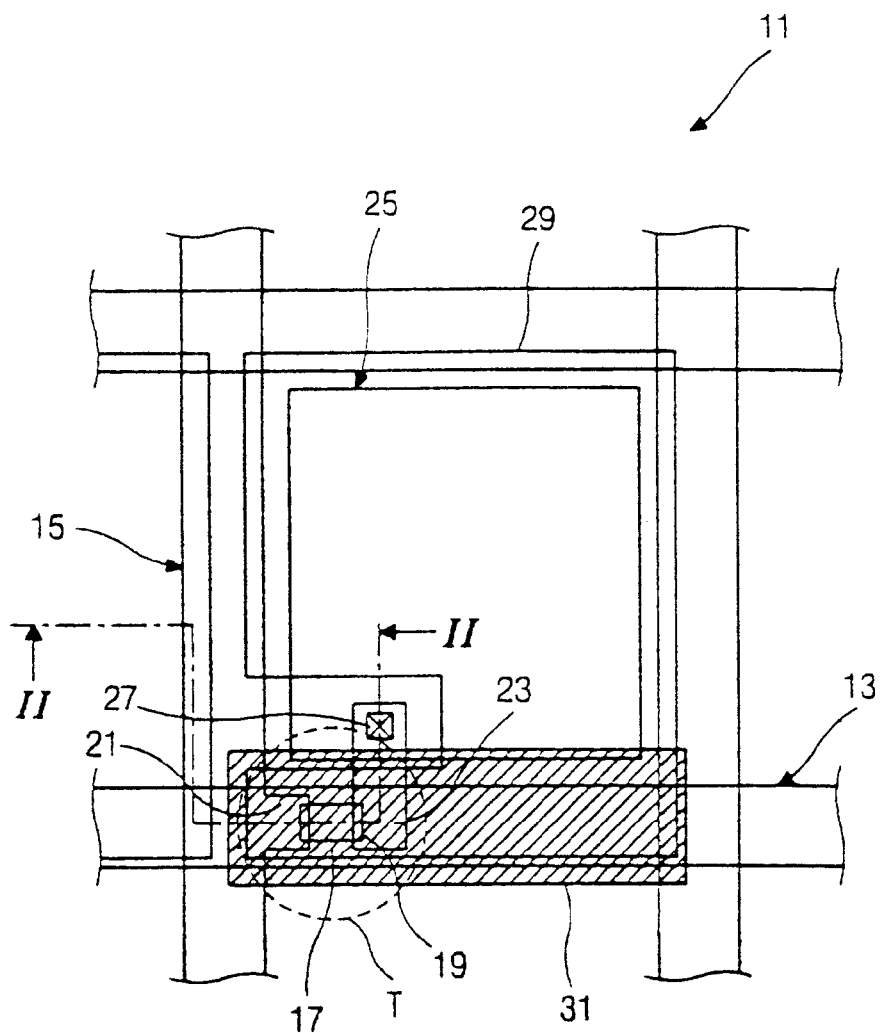
FIG. 1 is a plan view illustrating an array substrate for use in a liquid crystal display device according to the related art.
Figure 2A:
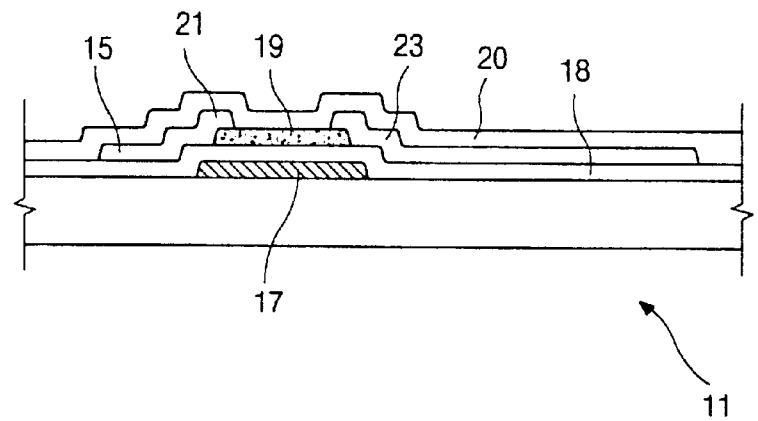
FIGS. 2a to 2e are cross sectional views illustrating fabrication process steps of an array substrate having color filters according to the related art.
Figure 2B:
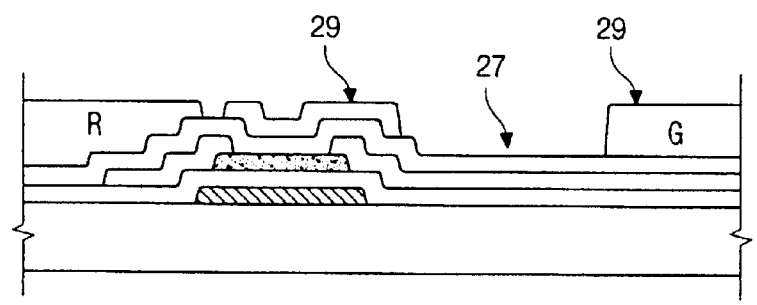
Figure 2C:
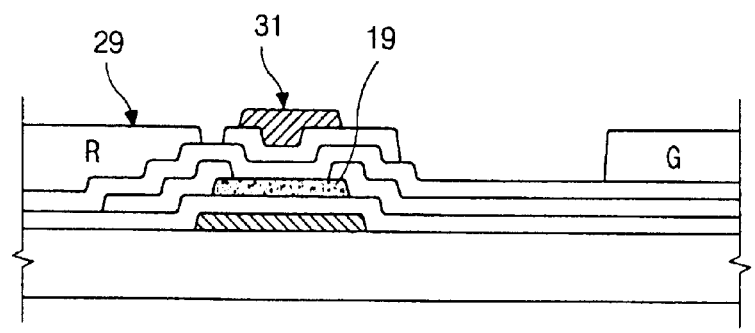
Figure 2D:
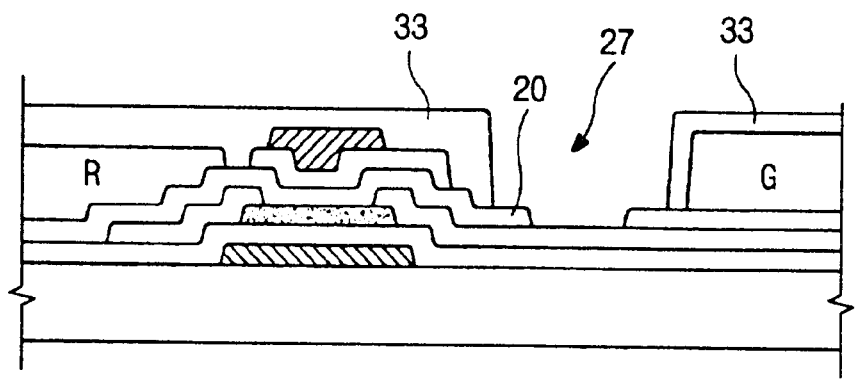
Figure 2E:
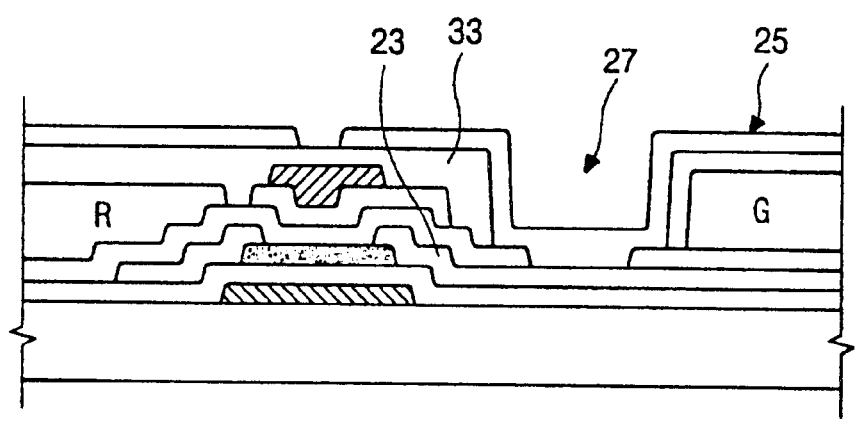
Figure 3:
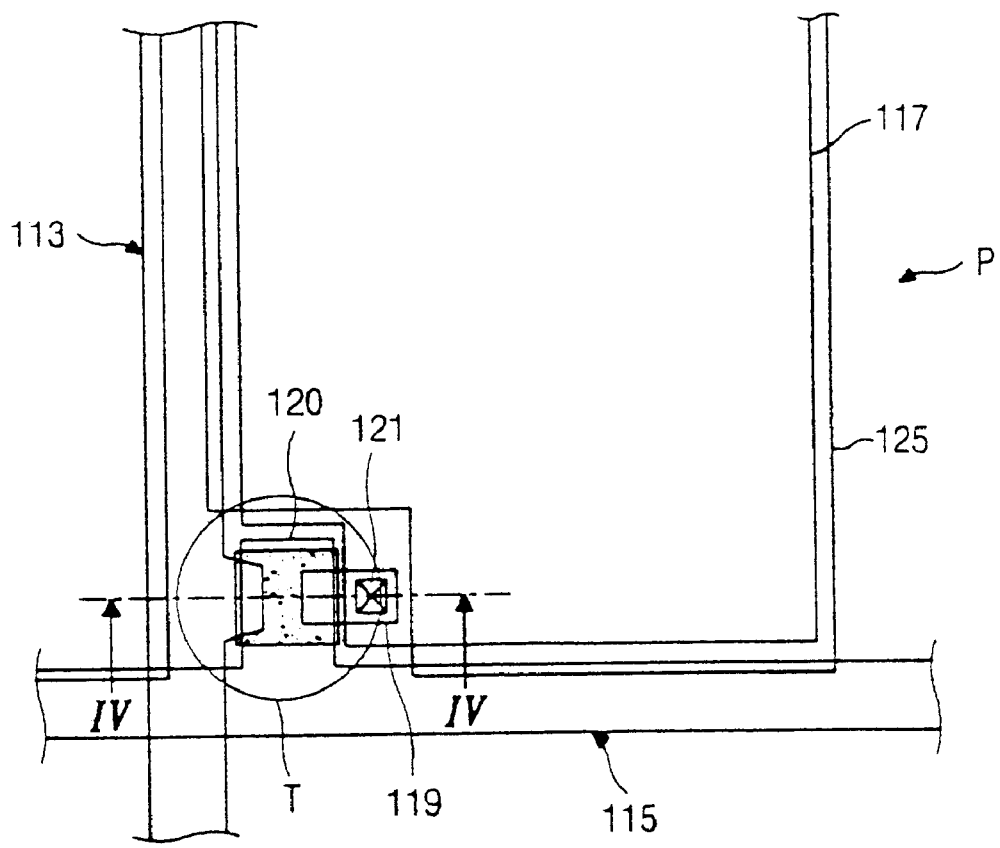
FIG. 3 is a plan view illustrating an array substrate for use in a liquid crystal display device according to a first embodiment of the present invention.

FIG. 3 is a plan view illustrating an array substrate for use in a liquid crystal display device according to a first preferred embodiment of the present invention. The array substrate of this embodiment adopts an inverted staggered type thin film transistor. As shown in FIG. 3, the array substrate has a thin film transistor "T", gate lines 115 arranged in a transverse direction, data lines 113 arranged in a longitudinal direction perpendicular to the gate lines 115, and a pixel electrode 117 at a pixel region "P" defined by gate and data lines 115 and 113. The pixel electrode 117 is connected to a drain electrode 119 through a drain contact hole 121. A color filter 125 is formed at a pixel region "P" while overlapping gate and data lines 115 and 113. The transistor "T" is not covered by the color filter 125.

FIGS. 4a to 4f are cross sectional views taken along the line IV—IV, illustrating fabrication process of the embodiment.

Figure 4A:
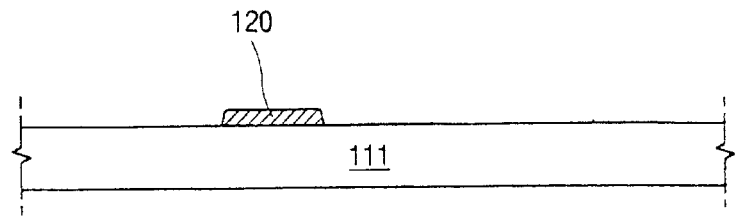
FIGS. 4a to 4f are cross sectional views taken along line IV—IV of FIG. 3, illustrating fabrication process steps of an array substrate having color filters according to the first embodiment of the present invention.

As shown in FIG. 4a, the gate line 115 including a gate electrode 120 is formed on the substrate 111 by depositing and patterning metallic material such as Aluminum (Al), Aluminum alloy, Chrome and Tungsten etc.

Figure 4B:
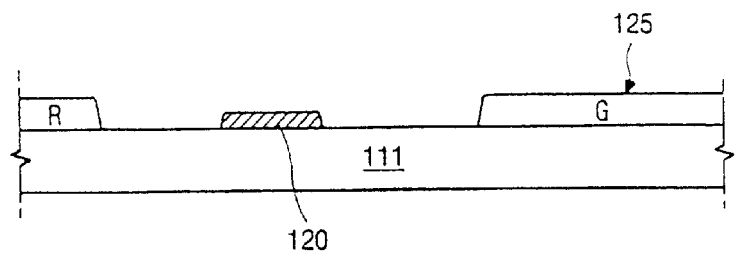

Next, as shown in FIG. 4b, color filters 125 are formed on the substrate 111 spaced apart from the gate electrode 120. The arrangement of the color filters is conventional. The color filters are divided into red, green and blue (R, G and B). For simplicity, given the conventional arrangement of the color filters, only R and G are depicted in FIGS. 4b–4f, and for that matter FIGS. 5d–5f and 6d–6e, discussed below.

In general, between the color filters there is positioned a black matrix for shielding light and serving as boundaries between the color filters. The black matrix for this purpose can include Chrome having an optical density of over 3.5 or carbon-like organic material.

In this embodiment, Chrome is preferably adopted for the gate and data lines 115 and 113 to serve as black matrix for the color filters.

Figure 4C:
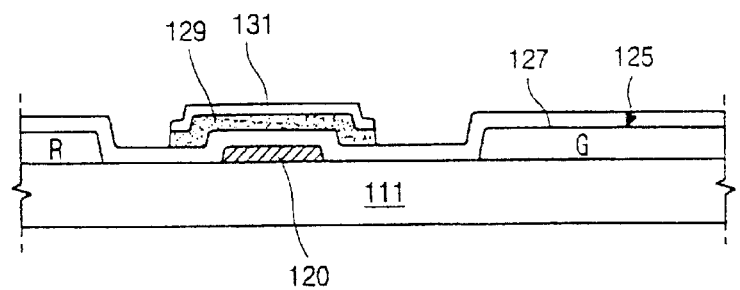

Next, as shown in FIG. 4c, an insulating layer 127 having silicon oxide or silicon nitride is formed on the gate electrode 120 and the color filters 127. And then an amorphous silicon layer and impurity-included-amorphous silicon layer are formed successively. The amorphous silicon layer and the impurity-included- amorphous silicon layer are patterned into an island type active layer 129 and ohmic contact layer 131.

Figure 4D:
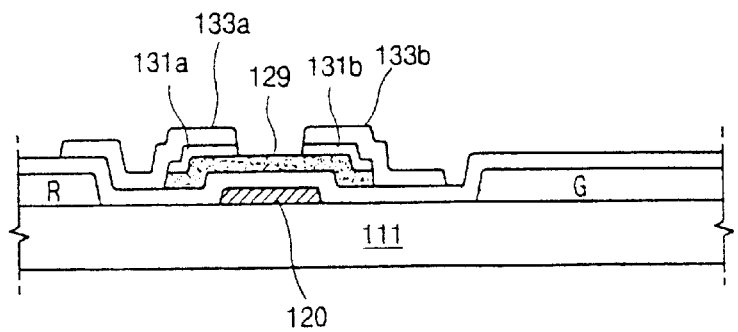

Next, as shown in FIG. 4d, a source electrode 133a and a drain electrode 133b spaced apart from each other on the active layer 129 are formed on the active layer 129 by depositing and patterning a metallic material such as Aluminum or Chrome, resulting in a first intermediate structure. The source electrode 133a is an elongated portion of the data line 113 (FIG. 3). The portion of the ohmic contact layer between the source and drain electrodes is removed when the source and drain electrodes are formed leaving portions 131a and 131b.

Figure 4E:
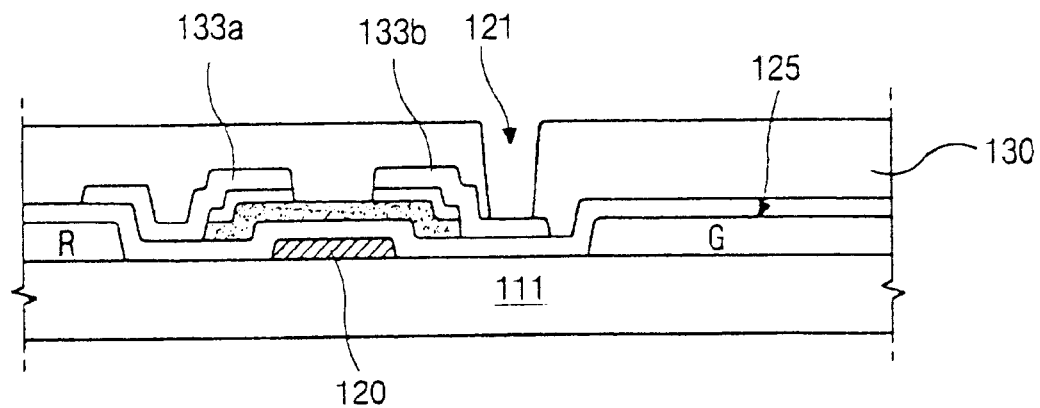

Next, as shown in FIG. 4e, on the first intermediate structure, translucent insulating material such as benzocyclobutene (BCB) is deposited and a drain contact hole 121 over the drain electrode 133b is formed. Since BCB has insulating characteristics, high resistance to wetting and transmissivity of light, it acts as a planarizing layer. The BCB has much lower electric permittivity than silicon nitride or silicon oxide, thus it advantageously does not accumulate as many electrons in itself as other insulating layer such as silicon nitride layer or silicon oxide layer.

Figure 4F:
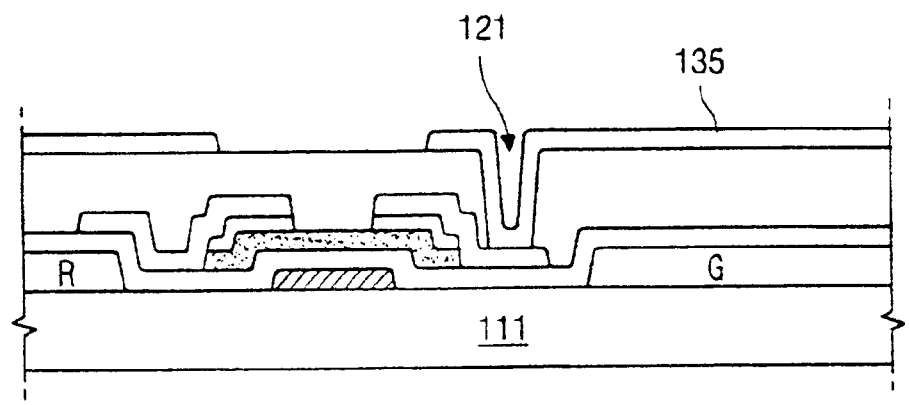

Next, as shown in FIG. 4f, transparent conducting material such as indium tin oxide or indium zinc oxide is deposited and patterned on the BCB layer to form a pixel electrode 135 connected to the drain electrode 133b through the drain contact hole 121.

As explained above, according to this embodiment since the gate and data lines can act as black matrix for color filters, there needs no further formation process for black matrix, leading to reducing the process steps. Since insulation between data line and pixel electrode is achieved with BCB layer, the parasitic capacity between them can be lowered.

FIGS. 5a to 5f illustrate a fabricating process of an array substrate according to the second embodiment of the invention. The array substrate of this embodiment adopts a coplanar type thin film transistor, which has similar plane structure of that of inverted staggered type TFT. Thus, a plan view of this embodiment is omitted.

Figure 5A:
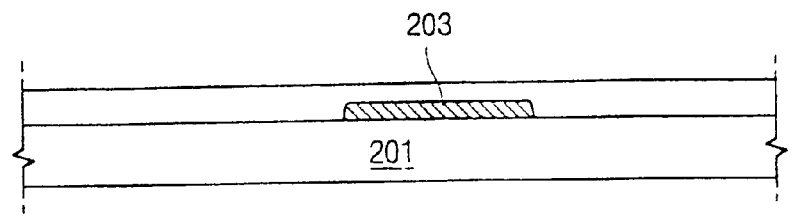
FIGS. 5a to 5f are similar views to FIGS. 4a to 4f, illustrating fabrication process steps of an array substrate having color filters according to a second embodiment of the present invention.

As shown in FIG. 5a, a light shielding layer 203 is formed on a substrate 201. The light shielding layer 203 is positioned at a corresponding position where the active layer will be formed in the later steps.

Figure 5B:
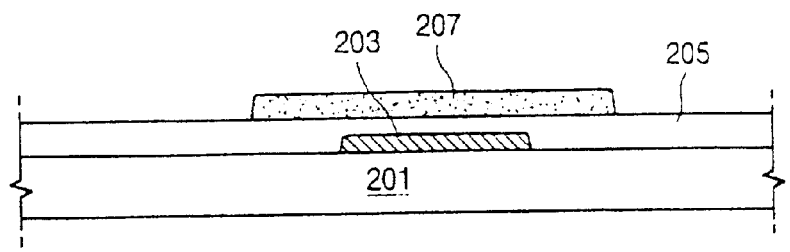

Next, as shown in FIG. 5b, a buffer layer 205 of insulating material and the active layer 207 having an island shape are formed.

Figure 5C:
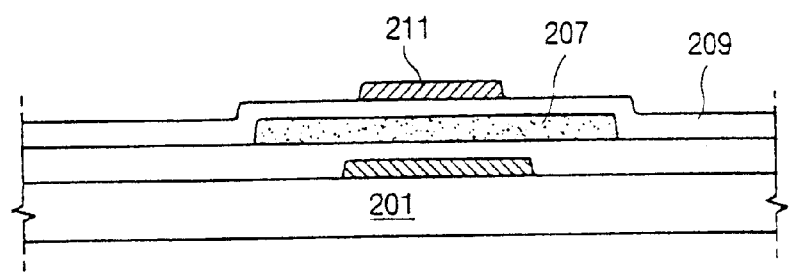

Next, as shown in FIG. 5c, on the substrate 201 having the active layer 207, insulating material and metallic material are deposited, in this order, to form a first insulating layer 209 and a metallic layer. The metallic layer is patterned into a gate line having a gate electrode 211 over the active layer 207.

Figure 5D:
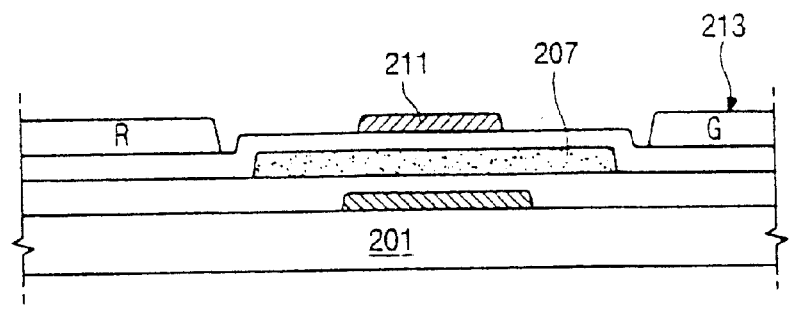

Next, as shown in FIG. 5d, color filters 213 are formed on the first insulating layer 209 in the same plane with the gate electrode 211, resulting in a second intermediate structure. The method of formation of color filters 213 is known, as discussed above.

Figure 5E:
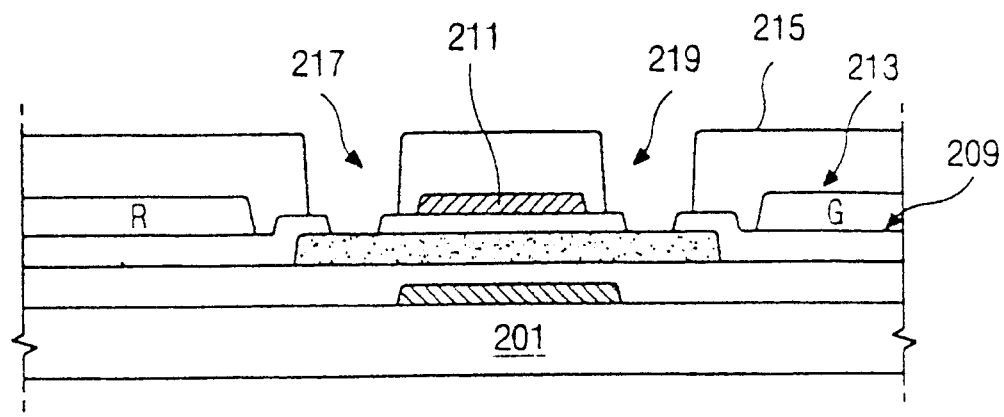

Next, as shown in FIG. 5e, on the second intermediate structure, a second insulating layer 215 of translucent insulating material such as BCB is formed. Near the opposing end portions of gate electrode 211, the first and second insulating layers are patterned to form source and drain electrode contact holes 217 and 219 which expose the active layer 207, resulting in a third intermediate structure.

Figure 5F:
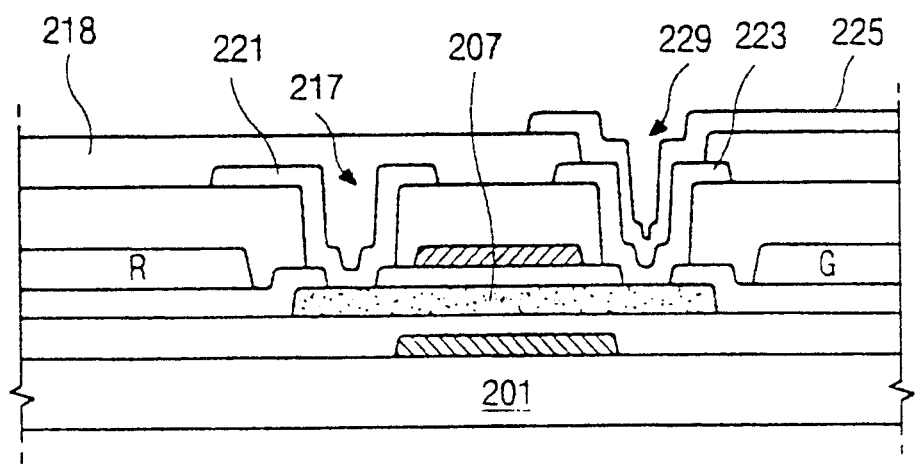

Next, as shown in FIG. 5f, by depositing and patterning metallic material on the third intermediate structure, a source electrode 221 connecting to the active layer 207 through the source electrode contact hole 217 and a drain electrode 223 connecting to the active layer 207 through the drain electrode contact hole 219 are formed. Then, by depositing translucent insulating material such as BCB on the source and drain electrodes 221 and 223, a third insulating layer 218 is formed. The third insulating layer 218 is patterned to have a drain contact hole 229 at the same location with the drain electrode contact hole 219. After that, on the third insulating layer 218, by depositing and patterning transparent conductive material such as indium tin oxide or indium zinc oxide, a pixel electrode 225 contacting the drain electrode 223 through drain contact hole 229 is formed. In this embodiment, since the insulating layer between the data line and the pixel electrode can include BCB, the parasitic capacity between them can be reduced.

FIGS. 6a to 6e illustrate a fabricating process of an array substrate according to the third embodiment of the invention. The array substrate of this embodiment adopts a coplanar type thin film transistor, which has similar plane structure of that of inverted staggered type TFT. Thus, a plan view for this embodiment is omitted.

Since the processing step is very similar to the corresponding step for the second embodiment, the detailed explanation is omitted.

Figure 6A:
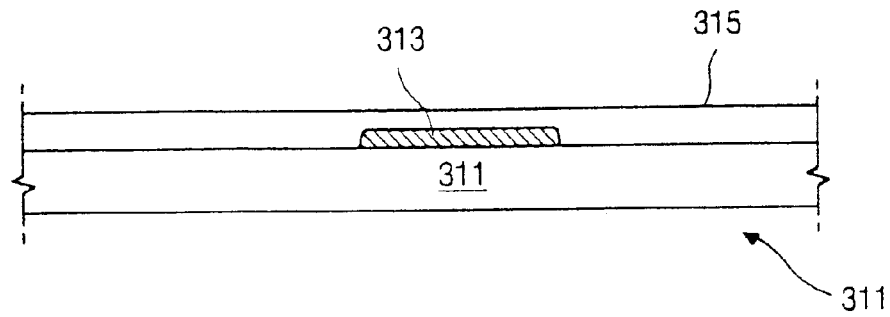
FIGS. 6a to 6e are similar views to FIGS. 4a to 4f, illustrating fabrication process steps of an array substrate having color filters according to a third embodiment of the present invention.
Figure 6B:
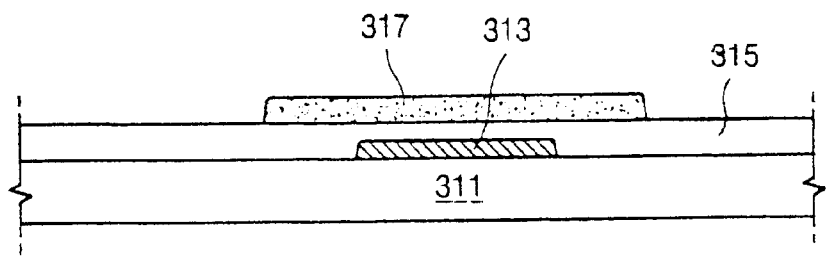
Figure 6C:
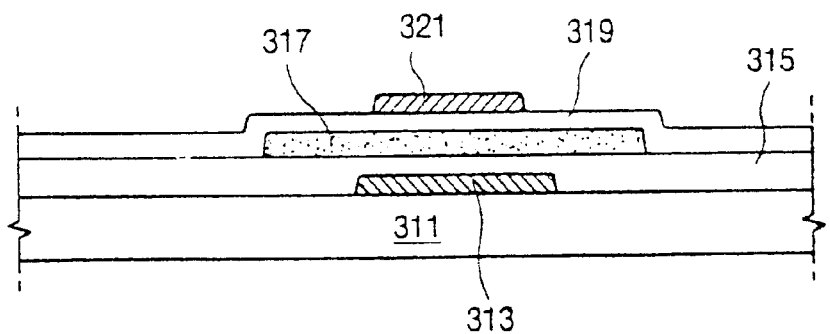

Steps for FIGS. 6a to 6c are the same as those for FIGS. 5a to 5c. That is, on the substrate 311 a light shielding layer 313, a buffer layer 315, an active layer 317, a first insulating layer 319, and a gate electrode 321 are successively formed.

Figure 6D:
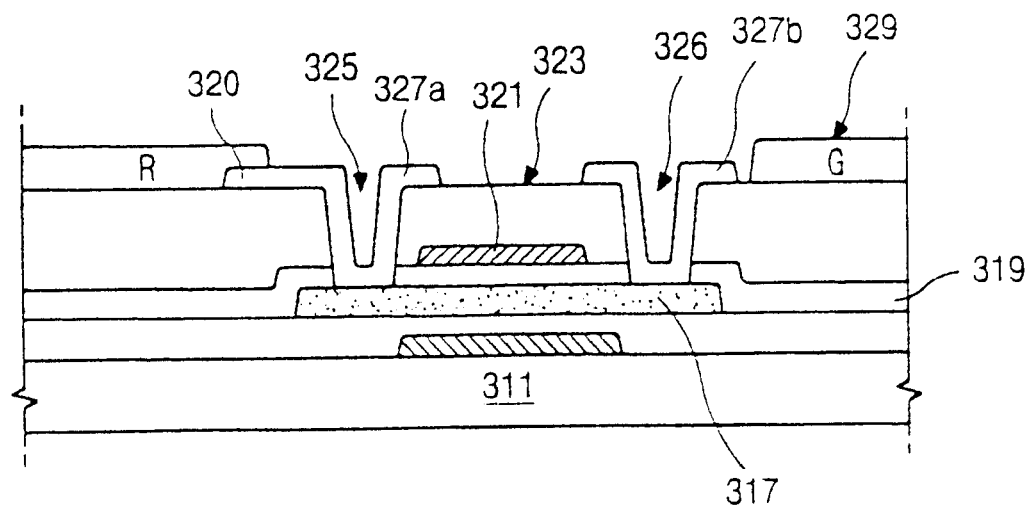
Figure 6E:
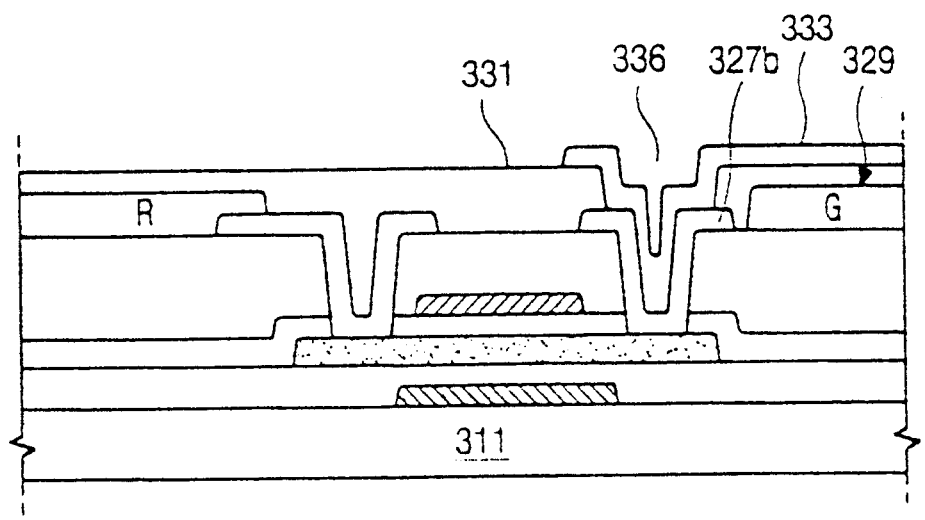

As shown in FIG. 6d, on a gate electrode 321, a second insulating layer 323 is formed. Near the opposing end portions of gate electrode 321, the second insulating layer 323 is patterned to form source and drain electrode contact holes 325 and 326 which expose to the active layer 317.

Next, by depositing and patterning metallic material on the substrate, a source electrode 327a connecting to the active layer 317 through the source electrode contact hole 325 and a drain electrode 327b connecting to the active layer 317 through the drain electrode contact hole 326 are formed. The source electrode 327a is an elongated portion of a data line 320. After that, color filters 329 are formed on the second insulating layer while overlapping some portion of the data line 320.

Then, by depositing translucent insulating material such as BCB on the color filters 329, a third insulating layer 331 is formed. The third insulating layer 331 is patterned to have a drain contact hole 336 at the same location with the drain electrode contact hole 326. After that, on the third insulating layer 331 by depositing and patterning transparent conductive material such as indium tin oxide or indium zinc oxide, a pixel electrode 333 contacting the drain electrode 327b through drain contact hole 336 is formed.

As explained above, according to the invention, the gate and data lines can be used as black matrix between the color filters, the additional process for black matrix can be reduced.

Since, between the data line and pixel electrode, a layer having BCB is adopted, the parasitic capacity between them can be reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of fabricating an array substrate for use in a liquid crystal display device that produces an arrangement wherein gate and data lines are located such that a need for separate black matrix elements is eliminated, the method comprising:

forming a gate line having a gate electrode on a substrate;

forming a color filter layer on the substrate, the color filter layer spaced apart from the gate line;

forming a first insulating layer on the color filter layer and the gate line;

forming a semiconductor layer and an ohmic contact layer sequentially on the gate electrode;

forming a data line crossing the gate line;

forming source and drain electrodes on the ohmic contact layer;

wherein the formation of the data line and source and drain electrodes complete an intermediate structure;

forming a protecting layer of transparent insulating material on the intermediate structure, the protecting layer having a drain contact hole at a corresponding position of the drain electrode; and forming a pixel electrode on the protecting layer that contacts the drain electrode through the drain contact hole.

2. The method of claim 1, wherein the transparent insulating material is benzocyclobutene.

3. A method of fabricating an array substrate for an LCD device, the method comprising:
- forming a light shielding layer having a shape of an island on a substrate;
- forming a buffer layer on the substrate and the light shielding layer;
- forming an active layer sequentially on the buffer layer over the light shielding layer, the active layer having an island shape;
- forming a first insulating layer on the active layer and the buffer layer;
- forming a gate electrode on the first insulating layer;
- forming a color filter spaced apart from the gate electrode on the same plane as the gate electrode to complete an intermediate structure;
- forming a gate insulating layer of transparent insulating material on the intermediate structure, the gate insulating layer having first and second contact holes;
- forming the source and drain electrodes on the protecting layer, the source and drain electrodes connecting to the active layer via the first and second contact holes, respectively;
- forming a protecting layer of transparent insulating material on the source and drain electrodes, the protecting layer having a drain contact hole exposing the drain electrode; and
- forming a pixel electrode on the protecting layer, the pixel electrode connecting to the drain electrode through the drain contact hole.

4. The method of claim 3, wherein the transparent insulating material is benzocyclobutene.

5. A method for fabricating an array substrate for an LCD device, the method comprising:
- forming a light shielding layer on a substrate;
- forming a first insulating layer on the light shielding layer;
- forming an active layer on the first insulating layer;
- forming a second insulating layer on the active layer;
- forming a gate electrode on the second insulating layer;
- forming a third insulating layer on the gate electrode;
- forming source and drain electrodes on the third insulating layer, the source and drain electrodes connecting to the active layer;
- forming a color filter layer on the third insulating layer;
- forming a fourth insulating layer of transparent material on the source and drain electrodes and the color filter layer; and
- forming a pixel electrode on the fourth insulating layer, the pixel electrode contacting the drain electrode.

6. The method of claim 5, wherein the transparent insulating material is benzocyclobutene.

7. An array substrate for use in a liquid crystal display device wherein an arrangement of gate and data lines eliminates a need for separate black matrix elements, the substrate comprising:
- a gate line having a gate electrode on a substrate;
- a color filter layer on the substrate, the color filter layer being spaced apart from the gate line;
- a first insulating layer on the color filter layer and the gate line;
- a semiconductor layer on the first insulating layer;
- an ohmic contact layer on the first insulating layer;
- a data line crossing the gate line;
- source and drain electrodes on the ohmic contact layer;
- wherein the recited claim elements through and inclusive of the data line and source and drain electrodes define an intermediate structure;
- a protecting layer of transparent insulating material on the intermediate structure, the protecting layer having a drain contact hole at a corresponding position of the drain electrode; and
- a pixel electrode on the protecting layer that contacts the drain electrode through the drain contact hole.

8. The substrate of claim 7, wherein the transparent insulating material is benzocyclobutene.

9. An array substrate for an LCD device, the substrate comprising:
- a light shielding layer having a shape of an island on a substrate;
- a buffer layer on the substrate and the light shielding layer;
- an active layer on the buffer layer over the light shielding layer, the active layer having an island shape;
- a first insulating layer on the active layer and the buffer layer;
- a gate electrode on the first insulating layer;
- a color filter spaced apart from the gate electrode on the same plane as the gate electrode;
- wherein the recited claim elements through and inclusive of the color filter define an intermediate structure;
- a gate insulating layer of transparent insulating material on the intermediate structure, the gate insulating layer having first and second contact holes;
- source and drain electrodes on the protecting layer, the source and drain electrodes connecting to the active layer via the first and second contact holes, respectively;
- a protecting layer of transparent insulating material on the source and drain electrodes, the protecting layer having a drain contact hole exposing the drain electrode; and
- a pixel electrode on the protecting layer, the pixel electrode connecting to the drain electrode through the drain contact hole.

10. The substrate of claim 5, wherein the transparent insulating material is benzocyclobutene.

11. An array substrate for an LCD device, the substrate comprising:
- a light shielding layer on a substrate;
- a first insulating layer on the light shielding layer;
- an active layer on the first insulating layer;
- a second insulating layer on the active layer;
- a gate electrode on the second insulating layer;
- a third insulating layer on the gate electrode;
- source and drain electrodes on the third insulating layer, the source and drain electrodes connecting to the active layer;
- a color filter layer on the third insulating layer;
- a fourth insulating layer of transparent material on the source and drain electrodes and the color filter layer; and
- a pixel electrode on the fourth insulating layer, the pixel electrode contacting the drain electrode.

12. The substrate of claim 11, wherein the transparent insulating material is benzocyclobutene.

* * * * *